(12) United States Patent
Hogg

(10) Patent No.: US 8,681,442 B2
(45) Date of Patent: Mar. 25, 2014

(54) DISK DRIVE COMPRISING EXTENDED RANGE HEAD PROXIMITY SENSOR

(75) Inventor: Dennis W. Hogg, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 90 days.

(21) Appl. No.: 13/470,190

(22) Filed: May 11, 2012

(65) Prior Publication Data

US 2013/0301158 A1 Nov. 14, 2013

(51) Int. Cl.
 *G11B 5/09* (2006.01)
 *G11B 21/02* (2006.01)

(52) U.S. Cl.
 USPC ................................ 360/46; 360/75

(58) Field of Classification Search
 None
 See application file for complete search history.

(56) References Cited

U.S. PATENT DOCUMENTS

| | | | |
|---|---|---|---|
| 4,259,643 A | 3/1981 | Monticelli et al. | |
| 4,510,442 A | 4/1985 | Neher | |
| 4,596,148 A | 6/1986 | Lasser et al. | |
| 4,768,170 A | 8/1988 | Hoff | |
| 5,986,839 A * | 11/1999 | Klaassen et al. | 360/66 |
| 6,259,670 B1 * | 7/2001 | Hrinya | 369/124.1 |
| 6,359,746 B1 | 3/2002 | Kakekado et al. | |
| 6,504,669 B1 | 1/2003 | Janz et al. | |
| 6,529,342 B1 | 3/2003 | Feng et al. | |
| 6,775,089 B1 | 8/2004 | Bonin et al. | |
| 6,876,509 B2 | 4/2005 | Bonin et al. | |
| 6,888,693 B2 | 5/2005 | Boutaghou et al. | |
| 6,967,805 B1 | 11/2005 | Hanchi et al. | |
| 6,980,383 B2 | 12/2005 | Brunnett et al. | |
| 6,982,406 B2 | 1/2006 | Chen | |
| 6,998,850 B2 | 2/2006 | Baumgartner | |
| 7,068,457 B2 | 6/2006 | Riddering et al. | |
| 7,280,305 B2 | 10/2007 | Kwon et al. | |
| 7,310,197 B2 | 12/2007 | Baumgart et al. | |
| 7,375,912 B2 * | 5/2008 | Brannon et al. | 360/75 |
| 7,440,220 B1 | 10/2008 | Kang et al. | |
| 7,465,995 B2 | 12/2008 | Chu et al. | |
| 7,679,857 B2 | 3/2010 | Zhu et al. | |
| 7,796,356 B1 | 9/2010 | Fowler et al. | |
| 7,800,858 B1 | 9/2010 | Bajikar et al. | |

(Continued)

FOREIGN PATENT DOCUMENTS

| | | |
|---|---|---|
| EP | 0246433 B1 | 5/1992 |
| WO | 03019559 A1 | 3/2003 |
| WO | 2005077043 A3 | 8/2005 |

OTHER PUBLICATIONS

U.S. Appl. No. 13/235,209, filed Sep. 16, 2011, Dennis W. Hogg, 16 pages.

(Continued)

*Primary Examiner* — Thang Tran

(57) ABSTRACT

A disk drive is disclosed comprising a head actuated over a disk, and a fly height transducer operable to generate a fly height signal for the head. The disk drive further comprises control circuitry comprising a current sensor operable to detect a current flowing through the fly height transducer. The current sensor comprises a differential amplifier operable to amplify the current flowing through the fly height transducer over a first range using a first gain, and amplify the current flowing through the fly height transducer over a second range using a second gain less than the first gain, wherein at least part of the second range is different than the first range.

16 Claims, 2 Drawing Sheets

(56) References Cited

U.S. PATENT DOCUMENTS

| | | |
|---|---|---|
| 7,808,746 B2 | 10/2010 | Burbank et al. |
| 7,903,365 B2 | 3/2011 | Watanabe |
| 7,952,829 B2 | 5/2011 | Ionescu |
| 2005/0128630 A1* | 6/2005 | Huang et al. ............... 360/75 |
| 2005/0174665 A1 | 8/2005 | Zhang et al. |
| 2005/0258339 A1 | 11/2005 | Chen |
| 2006/0072232 A1* | 4/2006 | Fischer ............... 360/46 |
| 2006/0077584 A1* | 4/2006 | Nainar ............... 360/46 |
| 2006/0268445 A1* | 11/2006 | Brannon et al. ............... 360/75 |
| 2007/0201158 A1* | 8/2007 | Chan ............... 360/75 |
| 2009/0310247 A1* | 12/2009 | Suzuki ............... 360/75 |
| 2010/0020439 A1 | 1/2010 | Watanabe |
| 2010/0027157 A1* | 2/2010 | Nagasaka ............... 360/75 |
| 2011/0163730 A1* | 7/2011 | Zhang et al. ............... 323/234 |

OTHER PUBLICATIONS

Notice of Allowance dated Jul. 31, 2013 from U.S. Appl. No. 13/235,209, 15 pages.

* cited by examiner

DISK DRIVE COMPRISING EXTENDED RANGE HEAD PROXIMITY SENSOR

BACKGROUND

Current sensors are employed in numerous applications, such as light sensors, temperature sensors, gas sensors, magnetic sensors, motion sensors, proximity sensors, etc. A current sensing circuit typically comprises a suitable transducer that responds to an external stimulus, such as a photodiode responding to changing light, a magnetoresistive sensor responding to changing magnetic flux, or a tunneling current proximity probe responding to the proximity of elements, such as the proximity of a head to a disk in a disk drive. Typically the resistance of a current sensing transducer changes in response to the external stimulus so that when a bias voltage is applied to the transducer, the change in resistance caused by a change in the external stimulus results in a corresponding change in current passing through the transducer. Accordingly, a current sensor is typically employed to detect the change in current and thereby detect changes in the external stimulus.

Certain current sensing transducers, such as the aforementioned tunneling current proximity sensor, operate at very large resistance relative to the stimulus, and therefore they transduce an extremely small current (e.g., nanoamperes). There is, therefore, a need for an extremely sensitive current sensor capable of accurately detecting the extremely small currents generated by certain current sensing transducers.

DETAILED DESCRIPTION OF EMBODIMENTS OF THE INVENTION

Figure 1A:
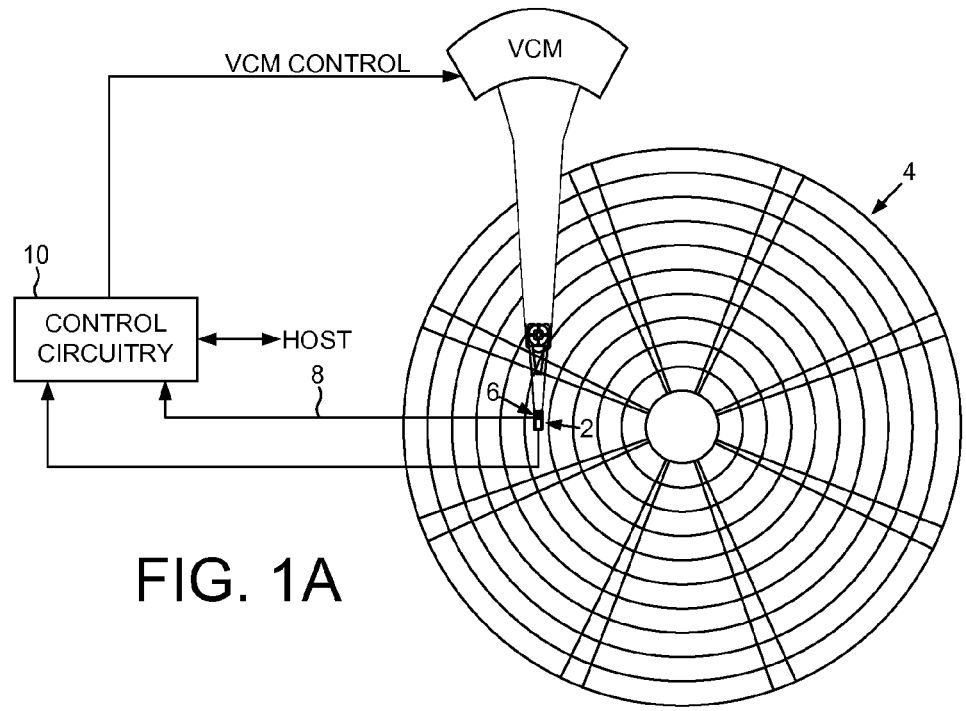
FIG. 1A shows a disk drive according to an embodiment of the present invention comprising a head actuated over a disk, a fly height transducer, and control circuitry including a current sensor operable to detect a current flowing through the fly height transducer.

FIG. 1A shows a disk drive according to an embodiment of the present invention comprising a head 2 actuated over a disk 4, and a fly height transducer 6 operable to generate a fly height signal 8 for the head 2. The disk drive further comprises control circuitry 10 comprising a current sensor 12 (FIG. 1B) operable to detect a current flowing through the fly height transducer 6. The current sensor 12 comprises a differential amplifier operable to amplify the current flowing through the fly height transducer 6 over a first range 16 using a first gain (FIG. 2A), and amplify the current flowing through the fly height transducer 6 over a second range 18 using a second gain less than the first gain, wherein at least part of the second range is different than the first range.

Any suitable fly height transducer 6 may be employed in the embodiments of the present invention, and in one embodiment the fly height transducer 6 transduces the fly height of the head 2 into an extremely small current (e.g., nanoamperes). For example, in one embodiment the fly height transducer 6 may comprise a tunneling sensor that operates at very large resistance relative to the stimulus, and therefore transduces an extremely small current. In addition, the fly height transducer 6 may exhibit an exponential response as the head 2 comes in close proximity until it eventually contacts the disk 4. Accordingly, in one embodiment the current sensor 12 for detecting the current flowing through the fly height transducer 6 operates at a first gain over a first range corresponding to a higher fly height, and as the fly height decreases, the current sensor 12 eventually transitions into a second gain in order to detect the current over a second range.

Referring again to FIG. 1B, in this embodiment the current sensor 12 comprises a differential amplifier that operates according to a first and second gain. The differential amplifier comprises a first differential voltage output (OUT_R1) representing the current flowing through the fly height transducer 6 over the first range 16, and a second differential voltage output representing the current flowing through the fly height transducer 6 over the second range 18. In one embodiment, the second differential voltage output may correspond to OUT_R2. In another embodiment, the second differential voltage output may be generated by adding both of the above described voltage outputs (OUT_R1+OUT_R2).

Figure 1B:
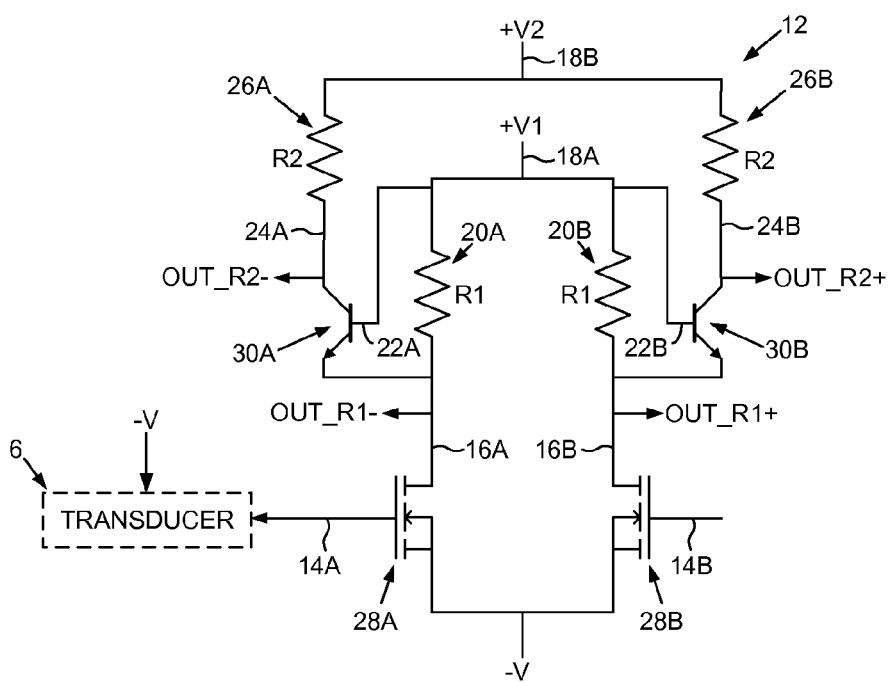
FIG. 1B shows a current sensor according to an embodiment of the present invention comprising a differential amplifier operable to amplify the current flowing through the fly height transducer over a first range using a first gain, and amplify the current flowing through the fly height transducer over a second range using a second gain less than the first gain.

In the embodiment of FIG. 1B, the differential amplifier 12 comprises a first input node 14A connected to the fly height transducer 6, and a first output node 16A connected to a first supply voltage +V1 18A through a first resistor R1 20A. The differential amplifier 12 further comprises a second input node 22A connected to the first supply voltage 18A, and a second output node 24A connected to a second supply voltage +V2 18B through a second resistor R2 26A. In one embodiment, the first supply voltage +V1 18A substantially equals the second supply voltage +V2 18B, and in another embodiment the first supply voltage +V1 18A is substantially different from the second supply voltage +V2 18B. The other components shown in FIG. 1B are mirror components having the same respective reference numbers as would be understood by one skilled in the art.

Figure 2A:
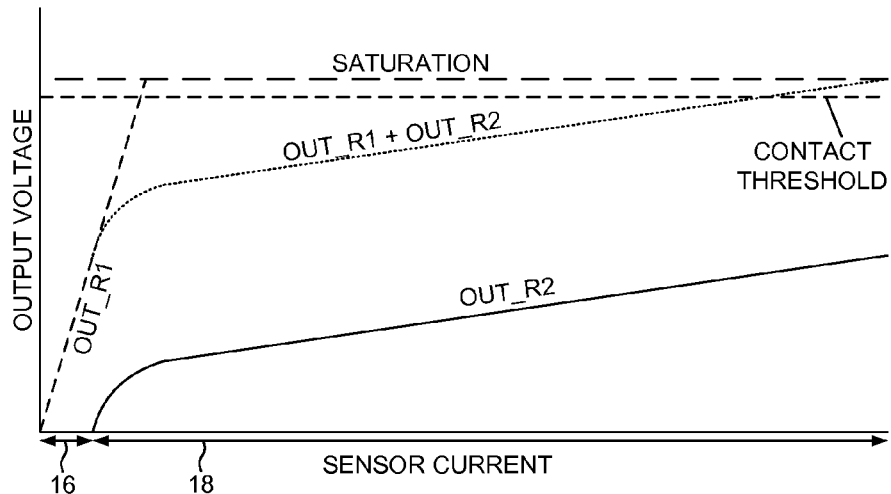
FIG. 2A is a graph illustrating the differential voltage outputs of the differential amplifier over the two different ranges of sensor currents according to an embodiment of the present invention.

The operation of the differential amplifier 12 shown in FIG. 1B is understood with reference to FIG. 2A which shows a graph of the differential voltage outputs OUT_R1 and OUT_R2 (y-axis) relative to the current flowing through the fly height transducer 6 (x-axis). At very low currents corresponding to a high fly height, both differential voltage outputs OUT_R1 and OUT_R2 are substantially zero. As the fly height decreases and the current begins to flow through the fly height transducer 6, a first transistor 28A of the differential amplifier 12 (FIG. 1B) begins conducting causing the first differential voltage output OUT_R1 to begin ramping according to the first gain as illustrated in FIG. 2A. When the current flowing through the fly height transducer 6 reaches a threshold level (at the end of the first range 16), a second transistor 30A begins conducting due to the voltage across the first resistor R1 20A increasing. In one embodiment, the second transistor 30A transitions the gain of the differential amplifier 12 by connecting the first resistor R1 20A substantially in parallel with the second resistor R2 26A.

Connecting the resistors R1 and R2 in parallel reduces the resistance of the output stage, thereby decreasing the gain of the differential amplifier 12. In one embodiment, the resistance of the second resistor R2 26A is less than the resistance of the first resistor R1 20A which further reduces the resistance when they are connected in parallel. This reduction in resistance at the output stage results in a corresponding increase in the range of the current sensor. Referring again to FIG. 2A, the first range 16 extends from zero current up to a threshold level during which the output of the current sensor is taken from the first differential voltage output OUT_R1. When the current reaches the threshold level, the output of the current sensor may be taken from the second differential voltage output OUT_R2, or the addition of OUT_R1 and OUT_R2 as shown in FIG. 2A. The current sensor exhibits an output voltage over an extended range 18 until eventually the first transistor 28A reaches a saturation level. Without transitioning into a lower gain in order to extend the range of the current sensor, the first differential voltage output OUT_R1 would reach the saturation level much faster as illustrated in FIG. 2A, resulting in a very limited range (and limited resolution) current sensor.

In one embodiment, the first and second differential voltage outputs 16A and 24A of the differential amplifier are evaluated to determine a proximity of the head 2 relative to the disk 4. In addition, the first and second differential voltage outputs 16A and 24A may be evaluated to detect when the head 2 has contacted the disk 4. For example, in one embodiment a head/disk contact event may be detected when the addition of the first and second voltage outputs (OUT_R1+ OUT_R2) exceeds a threshold as illustrated in FIG. 2A. In one embodiment, when head/disk contact is detected the differential amplifier 12 may be disabled (using a suitable isolation transistor not shown) in order to prevent the first transistor 28A from saturating. In this manner, the dual gain operation of the differential amplifier 12 as described above enables a very sensitive fly height transducer 6 (such as a tunneling sensor) to be used both as a proximity sensor and as a contact sensor.

Figure 2B:
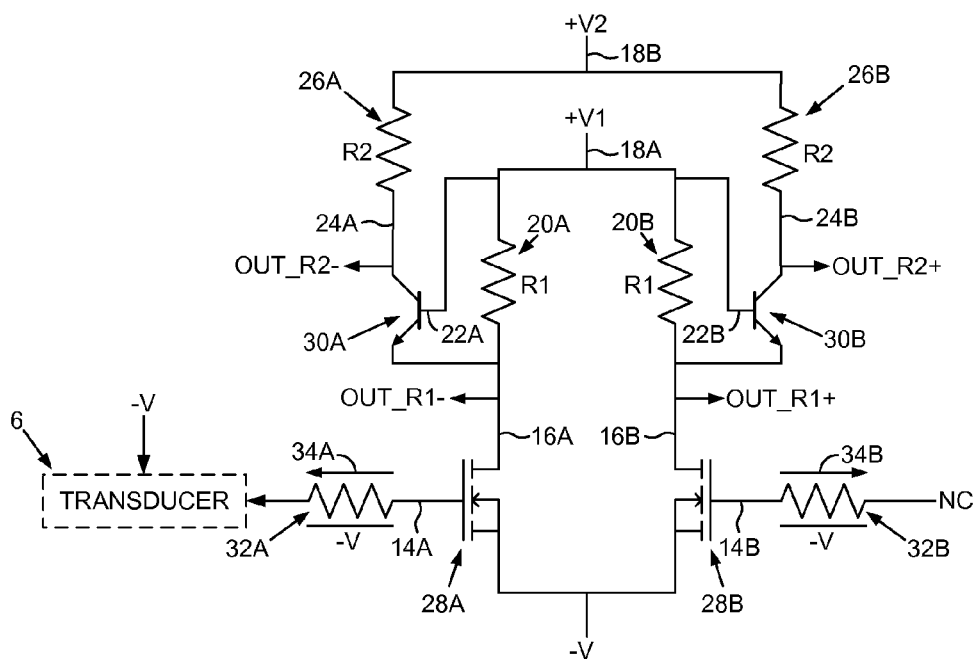
FIG. 2B shows an embodiment of the present invention wherein the current sensor comprises a differential amplifier biased by leakage current.

FIG. 2B shows a current sensor according to an embodiment of the present invention including the dual gain differential amplifier 12 described above with reference to FIG. 1B, and further comprising a first resistor 32A having a first end coupled to the first input node 14A and a second end for coupling to the transducer 6, and a second resistor 32B having a first end coupled to a second input node 14B and a second end. When the second end of the second resistor 32B is unconnected and the differential amplifier 12 is driven with a supply voltage, the first input node 14A is biased by a first leakage current 34A and the second input node 14B is biased by a second leakage current 34B such that the differential voltage outputs OUT_R1 and OUT_R2 represent a current flowing through the transducer 6.

In one embodiment, the differential amplifier 12 is fabricated such that the first leakage current 34A substantially matches the second leakage current 34B (e.g., by matching components). When the transducer 6 draws current it depletes the first leakage current 34A biasing the first input node 14A, thereby changing the voltage at the first input node 14A so that the differential voltage output represents the current flowing through the transducer 6. In this manner, the current sensor in this embodiment is capable of detecting very small currents flowing through the transducer 6 on the order of a fraction of the first leakage current 34A. For example, when the first leakage current 34A is a nanoampere the current sensor may detect a transducer current as small as a fraction of a nanoampere (e.g., 0.01 nanoamperes).

What is claimed is:

1. A disk drive comprising:
   a disk;
   a head actuated over the disk;
   a fly height transducer configured to generate a fly height signal for the head; and
   control circuitry comprising a current sensor configured to detect a current flowing through the fly height transducer, the current sensor comprising a differential amplifier configured to:
      amplify the current flowing through the fly height transducer over a first range using a first gain; and
      amplify the current flowing through the fly height transducer over a second range using a second gain less than the first gain, wherein at least part of the second range is different than the first range.

2. The disk drive as recited in claim 1, wherein the differential amplifier comprises
   a first differential voltage output representing the current flowing through the fly height transducer over the first range; and
   a second differential voltage output representing the current flowing through the fly height transducer over the second range.

3. The disk drive as recited in claim 1, wherein the first differential amplifier comprises a first transistor comprising:
   a first input node connected to the fly height transducer; and
   a first output node connected to a first supply voltage through a first resistor.

4. The disk drive as recited in claim 3, wherein the differential amplifier comprises a second transistor comprising:
   a second input node connected to the first supply voltage; and
   a second output node connected to a second supply voltage through a second resistor.

5. The disk drive as recited in claim 4, wherein the first supply voltage substantially equals the second supply voltage.

6. The disk drive as recited in claim 4, wherein the first supply voltage is substantially different from the second supply voltage.

7. The disk drive as recited in claim 4, wherein a resistance of the second resistor is less than a resistance of the first resistor.

8. The disk drive as recited in claim 4, wherein the second transistor transitions the gain of the differential amplifier from the first gain to the second gain when the current flowing through the fly height transducer reaches a threshold level.

9. The disk drive as recited in claim 8, wherein when the second transistor transitions the gain of the differential amplifier, the first transistor connects the first resistor substantially in parallel with the second resistor.

10. The disk drive as recited in claim 1, wherein the control circuitry is configured to detect the head contacting the disk in response to the differential amplifier.

11. The disk drive as recited in claim 1, wherein the fly height transducer comprises a tunneling sensor.

12. A method of operating a disk drive, the disk drive comprising a head actuated over a disk, and a fly height transducer configured to generate a fly height signal for the head, the method comprising:
   amplifying a current flowing through a fly height transducer over a first range using a first gain; and
   amplifying the current flowing through the fly height transducer over a second range using a second gain less than the first gain, wherein at least part of the second range is different than the first range.

13. The method as recited in claim 12, further comprising:

generating a first differential voltage output representing the current flowing through the fly height transducer over the first range; and generating a second differential voltage output representing the current flowing through the fly height transducer over the second range.

14. The method as recited in claim 12, further comprising transitioning from the first gain to the second gain when the current flowing through the fly height transducer reaches a threshold level.

15. The method as recited in claim 12, further comprising detecting the head contacting the disk in response to the differential amplifier.

16. The method as recited in claim 12, wherein the fly height transducer comprises a tunneling sensor.

* * * * *